United States Patent [19]
Findley

[11] Patent Number: 5,176,751
[45] Date of Patent: Jan. 5, 1993

[54] PELLETS USEFUL IN PRODUCTION OF PLASTIC RESIN MATERIALS

[75] Inventor: Larry K. Findley, Sandusky, Ohio

[73] Assignee: Thermocolor Corporation, Sandusky, Ohio

[21] Appl. No.: 663,254

[22] Filed: Mar. 1, 1991

[51] Int. Cl.$^5$ .................... C09C 3/08; C09C 3/10
[52] U.S. Cl. .................... 106/502; 106/272; 106/400; 106/401; 106/464; 106/469
[58] Field of Search ............... 106/272, 502, 400, 401, 106/464, 469

[56] References Cited

U.S. PATENT DOCUMENTS

| | | | |
|---|---|---|---|
| 2,952,888 | 9/1960 | Cornelius | 25/156 |
| 3,764,362 | 10/1973 | Hinley et al. | 106/446 |
| 3,778,288 | 12/1973 | Ridge et al. | 106/502 |
| 4,080,134 | 3/1978 | Klaeysen et al. | 425/143 |
| 4,446,086 | 5/1984 | Molenaar et al. | 264/118 |
| 4,789,321 | 12/1988 | Dingus | 425/222 |
| 4,834,902 | 5/1989 | Pioch et al. | 252/135 |

OTHER PUBLICATIONS

"The Production of A-C Polyethylene Color Concentrates", Technical Data Brochure for Plastics, No. PLS-002, from Allied Corporation, Morristown, N.J., (undated), 3 pages, particularly p. 2.

"Series CL Laboratory Pellet Mills", from California Pellet Mill Company, copyright 1987, 4 pages, particularly p. 3.

Primary Examiner—Mark L. Bell
Assistant Examiner—Scott L. Hertzog
Attorney, Agent, or Firm—Pearne, Gordon, McCoy & Granger

[57] ABSTRACT

A color concentrate pellet and a method for producing same. Pigment and carrier, both in powdered form, are placed in a high intensity bowl-type mixer. Small granules are produced. These granules are cold-pressed in a pellet mill and color concentrate pellets of a conventional size and shape are produced. These pellets contain up to 90% pigment by weight, and have a melting point of less than about 230° F. The pellets are friable and are mixable and processable with commercially sized natural resin pellets without substantial settling out. The carrier in the pellet acts as a universal carrier. Pellets with additives in substitution for pigments are also disclosed.

30 Claims, 1 Drawing Sheet

PELLETS USEFUL IN PRODUCTION OF PLASTIC RESIN MATERIALS

BACKGROUND OF THE INVENTION

This invention relates generally to the coloring of plastics, and more specifically to improved color concentrate pellets and the process for making same.

DISCUSSION OF RELATED ART

A common method of coloring plastics is to use color concentrate pellets. A color concentrate pellet is solid and is typically comprised of pigment and carrier. The pigment colors the plastic. The carrier acts as a binder and generally also acts to "wet" the pigment so that the pigment will mix well with the resin or plastic to be colored and so that the pigment will be well dispersed throughout the final molded, extruded, cast, or otherwise formed plastic product.

In conventional color concentrate pellets, the pigment is mixed with a carrier which is a thermoplastic resin material such as polypropylene, polyethylene, ABS, or polystyrene. These materials and the pellets produced thereby have a melting point in the range of 350° to 400° F. To make these conventional color concentrate pellets, the pigment and carrier are mixed and heated to about 550° to 600° F. The mixture melts and is mixed, and is extruded through an extruder and then solidifies and is cut into conventional pellet size, a cylinder about ⅛-inch in diameter and about ⅛ to ¼ inch in length.

These conventional color concentrate pellets contain organic and inorganic pigments, and are typically 30% to 50% pigment by weight with the balance being thermoplastic resin.

These conventional pellets are then mixed with natural resin pellets of the same general size and shape to effect colorization. Natural resin pellets are pellets which have not yet been colored. Commercially sized natural resin pellets include those that are cylindrically shaped, are about ⅛ inch in diameter, and are about ⅛ to ¼ inch long. Other commercially sized natural resin pellets, individually, have similar bulk or volume, but may have other regular geometric shapes or may have somewhat irregular shapes.

One problem with conventional color concentrate pellets is that the carrier generally must be compatible with the natural resin to be colored. To be compatible, the two must be the same or very similar. For example, a polypropylene carrier would be compatible with a polypropylene natural resin, but would not be compatible with PVC natural resin. Mixing a carrier with an incompatible natural resin could adversely affect the physical properties of the final molded product. The typical end product would comprise 96% natural resin, 2% carrier, and 2% pigment.

Another problem is that the high temperatures utilized in the extrusion process (550°-600° F.) tend to burn out or degrade organic pigments and certain inexpensive inorganic pigments which burn out or degrade between 400° and 550° F.

The conventional process is particularly disadvantageous with regard to organic pigments. Organic pigments tend to be more heat-sensitive, more unstable, and generally more expensive than inorganic pigments. The high temperatures of the conventional process are bad for organic pigments. These high temperatures also tend to use up a significant portion of the available heat history or heat tolerance of the pigments and carriers utilized. These high temperatures are thus disadvantageous.

Another result of the conventional process is that the pellets produced are ordinarily not friable. They must be melted at about 350° to 400° F. before they can be mixed with natural resin.

The Henschel Company of Germany has, for many years, manufactured a high intensity, bowl-type mixer. It has been known that granules of a more or less spherical shape with a diameter of about 30 to 50 microns and with a pigment loading of 70%-90% by weight could be manufactured in the Henschel mixer. The granules, however, are too small and do not mix well with the commercially-sized natural resin pellets. They were not accepted commercially.

OBJECTS OF THE INVENTION

It is an object of the invention to produce a color concentrate pellet having a carrier that is compatible with a wide range of natural resins. (Such carriers can be referred to as "universal carriers" or "partially universal carriers.")

It is a further object to produce a color concentrate pellet that can comprise up to 90% pigment, with a carrier which will melt at less than about 230° F. for better mixing, and will be manufactured at temperatures of less than 300° F. so as not to burn out or degrade certain heat-sensitive pigments, particularly organic pigments, which have heat sensitivity in the range of 400° to 550° F.

It is also an object of the invention to produce a color concentrate pellet that is friable, will not settle out upon mixing with commercially sized natural resin pellets, will look comparable to a conventional color concentrate pellet, can be made on less expensive equipment with less energy cost, and can be processed to pellet form at less than 230° F. It is an object of the invention to provide a process for manufacturing color concentrate pellets, particularly those containing organic pigments, which process will not unduly heat or otherwise adversely affect the qualities of organic pigments.

SUMMARY OF THE INVENTION

The present invention involves a process wherein color concentrate pellets of a generally conventional size and shape are formed. Pigment and carrier in powder form are placed in a high intensity bowl-type mixer. The carrier may comprise, for example, bis stearamide wax and A-C 400A ethylene vinyl acetate. The mixer is run until small granules in the range of 10 to 50 microns in diameter are formed. These granules are then run through a standard pellet mill without supplying external heat, substantial or otherwise. This results in a pellet that has, typically, 30% to 60% to 90% pigment by weight, and which has a carrier which is compatible with a wide range of natural resins. Preferably, the pellet of the present invention will have at least 45% by weight inorganic pigment. Five percent by weight pigment is useful in many cases; preferably, at least one percent by weight organic pigment is added where vivid color is desired. Preferably, the pellet will contain 50% to 90% pigment by weight (including both organic and inorganic). More preferably, the pellet will contain 70% to 90% pigment by weight and, more preferably still, the pellet will contain 80% to 90% pigment by weight. At high loading levels, energy, packaging, and shipping costs are reduced, and less carrier is used. Unfortunately, many commercial users of color concentrate pellets do not have adequate metering equipment to handle pellets with these higher loading levels, such as in the 80% to 90% range. With less accurate metering equipment, such users still prefer pellets with loading in the 50% to 75% range. When pellets have high loading levels, the metering equipment must be more accurate. It is believed that as users become more familiar with the benefits of pellets with loading levels in the 80% to 90% range, they will obtain more accurate metering equipment, and sales of these more highly loaded pellets will increase. For polyvinyl chloride siding, the pigment is frequently 100% inorganic and, typically, the pellet is in the range of 45% to 75% pigment by weight.

The pellet of the present invention will melt at less than about 230° F., preferably at about or less than about 200° F. The pellet is friable, and is made at a temperature of less than 230° F., preferably at less than about 200° F. As a result of this low temperature of manufacture, certain heat-sensitive organic pigments and certain inexpensive heat-sensitive inorganic pigments are made available to the end user. Such pigments tend to be degraded or burned out at temperatures from 400° to 550° F. Thus, they would be burned out or degraded if subjected to the conventional extruding process, which utilizes temperatures up to 550° to 600° F. Most end users mold their color concentrates and natural resin pellets at about 400° F.

The equipment utilized in the practice of the present invention is less expensive than that utilized in a conventional extruding line. The energy costs of the present invention are about six times less than that utilized in conventional extruding. The pellet produced by way of the present invention is conventionally shaped and ordinarily will disperse throughout the natural resin and will not settle out, substantially or otherwise, when mixed and processed with commercially sized natural resin pellets.

The fact that the pellets of the present invention melt at a temperature lower than that of conventional color concentrate pellets is advantageous, since they can be melted and mixed sooner and better, and be better incorporated with, the natural resin pellets. It is important that color concentrate pellet melt before the natural resin pellet for proper mixing and incorporation. Organic pigments are particularly hard to disperse. The pellets of the present invention have almost total dispersion of both organic and inorganic pigments. Streaks and color variation are effectively eliminated.

DETAILED DESCRIPTION OF THE INVENTION

Figure 1:
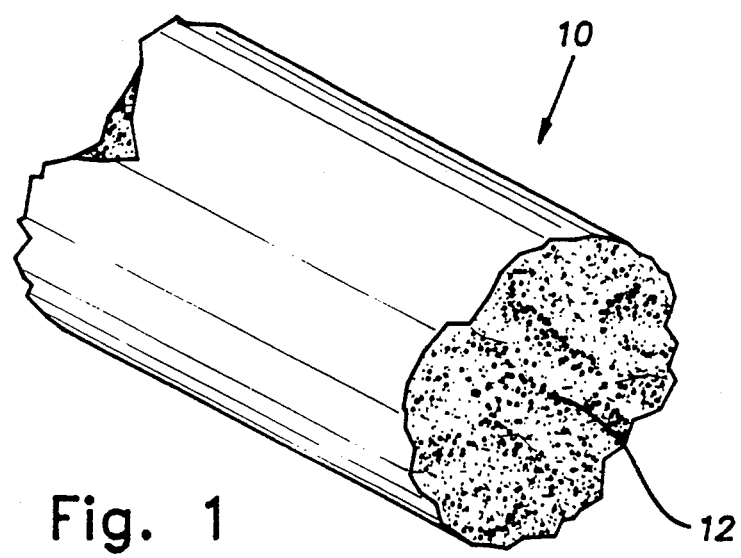
FIG. 1 is a perspective view of a pellet of the present invention.

FIG. 1 illustrates a typical color concentrate pellet 10 of the present invention. The pellet is cylindrical, approximately 3/32 to 5/32 inch in diameter, preferably 4/32 inch (⅛ inch) in diameter. The length is typically about ⅛ to about ¼ inch, preferably ⅛ inch. The ⅛-inch length size feeds better at the end user. The end 12 of the pellet typically has a broken appearance rather than a smooth knife edge or cut edge, such as may be visible on a conventionally extruded pellet.

It is difficult to characterize the pellets of the present invention on the basis of weight, since the different pigments and different carriers have different densities.

The pellet is comprised of pigment and carrier. As used in the specification and claims, pigment can include mixtures of different pigments. Pellets of the present invention typically are about 30% to about 90% pigment by weight and the balance is carrier. Organic pigments typically utilized include quinacridones and phthalocyanines and also azo-type pigments. Typical inorganic pigments include nickel titanate, titanium dioxide, carbon black, cobalt, and manganese chrome antimony titanate. Organic pigments are generally more expensive than inorganic pigments. Organic pigments tend to cost about $14 to $120 per pound. Inorganic pigments tend to cost about $0.50 to $14 per pound. Typical organic and inorganic pigments are listed in *Modern Plastics Encyclopedia*, Mid-October 1989 Issue, Vol. 66, No. 11, Mc-Graw-Hill, Inc., 1989, at pages 648–660, and the *Kirk-Othmer Concise Encyclopedia of Chemical Technology*, John Wiley & Sons, Inc. 1985, at pages 303–304 and 887–892, the contents of both of which are hereby incorporated by reference.

The present invention disperses organic pigments very well. Due to the oil absorption rate of organic pigments, one cannot achieve as high a loading level with organic pigments as one can tith inorganic pigments in color concentrate pellets of the present invention. One can achieve up to about 40% to 42% loading levels of organic pigments and up to about 90% loading levels of inorganic pigments in the pellets of the present invention. (Percentages are on a by-weight basis unless otherwise indicated.)

In the present invention, it is normal to use combinations of organic and inorganic pigments. Typically, in such a case the organic pigment is used as a toner to give vivid color, while the inorganic pigment, which tends to be non-transparent provides a more opaque color and fills up the color so as to reduce transparency. Typically, high levels of inorganic pigments are used in combination with lower levels of organic pigments. If the loading level is 90% by weight, the pigment may be 100% inorganic. Alternatively, if a loading level of 90% pigment by weight is desired, up to about 40% organic pigment can be put in, with the balance being inorganic pigment. If a loading level of 70% pigment by weight is desired, up to about 40% organic pigment can be put in, with the balance being inorganic pigment. If a 60% loading level is desired, this could, for example, be achieved with 10% organic/50% inorganic, or 30% organic/30% inorganic, or 40% organic/20% inorganic.

The carrier is utilized to bind the pigment and also generally operates to wet the pigment so that it is more dispersable in the natural resin to be colored. Bis stearamide wax is a typical carrier. If dry powdered pigment is incorporated directly into natural resin, there is a tendency for it to form chunks and streaks, rather than to uniformly color the natural resin.

A carrier is not necessarily a single compound; combinations of ingredients can be utilized as a carrier, which may also be referred to as a "carrier system." As utilized in the illustrated embodiments, the components of the carrier may have different melting points, but when mixed, the mixture or carrier will melt at about 160° to about 210° to about 220° F. The carrier has a melting point less than about 230° F., preferably at about or less than about 200° F. The color concentrate pellet, containing pigment and carrier, will melt at about the same temperature as that of the carrier of which it is formed. It is desirable that the carrier utilized be compatible with a wide range of types of natural resin. When this is achieved, a single type pellet can be utilized to color a variety of different types of natural resins. In the conventional art, as described above, a plurality of different types of pellets of the same color are, or may be, needed to color the same plurality of types of natural resin. The Examples hereinafter disclose carriers which are useful in the practice of the present invention.

To make pellets in accordance with the present invention, it is preferable to utilize a high intensity, bowl-type mixer, such as is known in the art and is available from the Henschel Company in Germany. This type mixer is jacketed and hooked up to a cooling system. It has a large rotary impeller that mixes and agitates the ingredients. The pigment and carrier, both in powdered form, are placed in the bowl without preheating. The mixer agitates and whips the ingredients by means of the impeller. This action frictionally raises the temperature of the ingredients. Heat is thus substantially mechanical rather than electrical or gas combustion in origin. As the melting point is approached, the carrier softens and agglomerates with the pigment particles. The pigment becomes wetted, ground, solvated, and encapsulated by the carrier. Encapsulation prevents the pigment from reagglomerating, and thus results in excellent pigment dispersion. The carrier of Example 1 hereinafter is particularly effective for organic pigments, which tend to be hydrophilic, because that carrier tends to drive off moisture. With regard to the carrier of Example 1, the isopropyl-tri-titanate reacts with the moisture in the pigments and the stearamide to produce alcohol. The alcohol acts as a catalyst with the stearamide to produce a crude ester. The encapsulated ester extends the heat stability of the pigment formula in addition to other chemicals present, which also become encapsulated. It has been determined through ageing studies that these granules are compatible with most polymer systems.

The high-intensity mixer is run until the power consumption drops to a level which indicates that the encapsulation process is complete. Granules, which are rounded, spherelike particles, are formed by this process. The granules are preferably about 10 microns to about 50 microns in diameter, and more preferably about 10 microns to about 30 microns in diameter. These granules can include up to about 90% pigment by weight. Processing the powdered pigment and carrier through the high intensity mixer can increase the bulk density of the mixture from about 1.75 times to about 3.5 times.

A problem with these granules is that they are too small for many purposes. They were not accepted in many aspects of the commercial marketplace because they did not have the size and shape of traditional extruded color concentrate pellets, and they tended to settle out when mixed and processed with natural resin pellets and could not be used effectively.

After the granules are formed in the high-intensity mixer, they are cooled to room temperature.

The granules are then processed through a pellet mill, such as Model CL type 3 from California Pellet Mill Company, 1114 East Wabash Avenue, Crawfordsville, Ind. 47933. This is a die-and-roller-type pellet mill. For an illustration of a die-and-roller-type pellet mill, see U.S. Pat. No. 4,080,134, the contents of which are incorporated herein by reference. In this pelletizing process, no external heat is added, substantial or otherwise. The temperature is not monitored and the pelleting is controlled by feed speed and volume only. The machine should be operated slowly enough so that the temperature is kept below the melting point of the carrier. Thus, the pellets are produced in a process, including high intensity mixing and pelletization, wherein the temperature does not exceed about 230° F., preferably not more than about 200° F.

Figure 2:
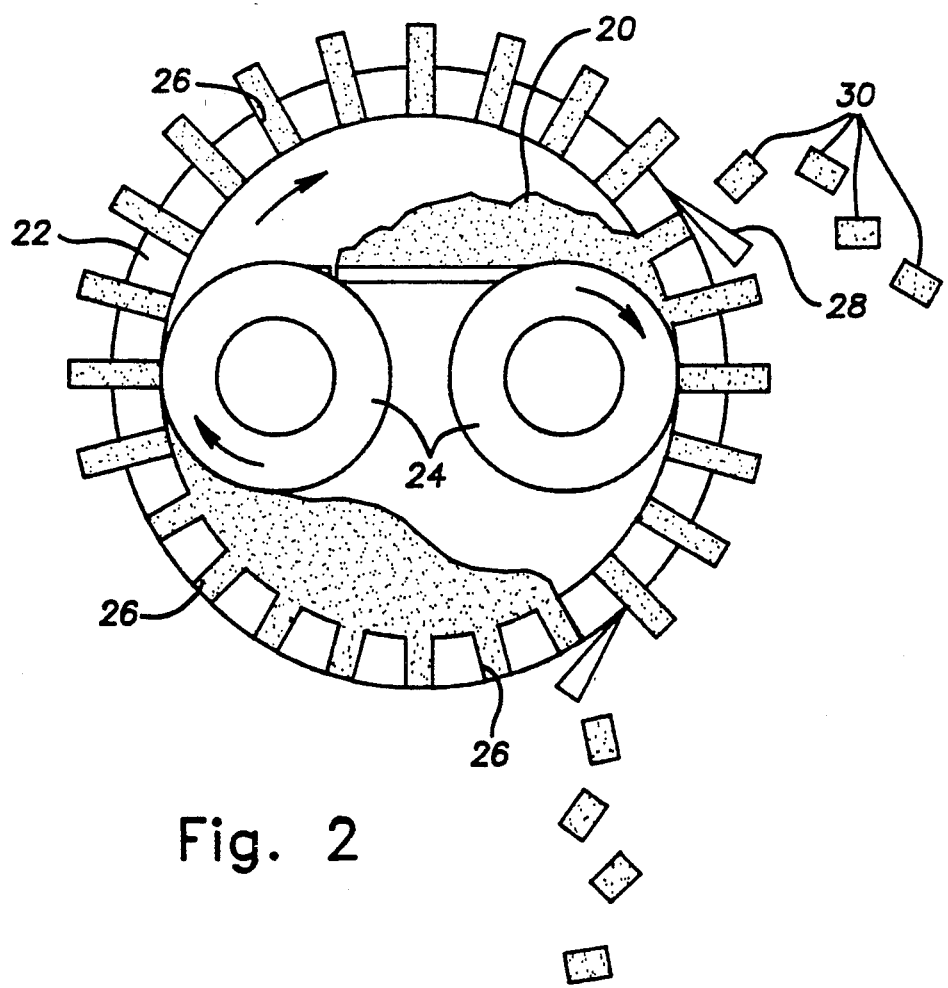
FIG. 2 is a somewhat schematic elevational view of the die and rollers of a die-and-roller-type pellet mill.

With reference to FIG. 2, the color concentrate granules 20 are shown with respect to the die and rollers of the pellet mill. The pelleting process utilizes compaction and compression to produce the color concentrate pellets. The granules are fed continuously in a controlled, even stream from a supply hopper (not shown) to the pelleting cavity. The color concentrate granules 20 can be seen in the pelleting cavity. Rotation of the die 22 in contact with the rollers 24 causes the rollers 24 to turn. The granules carried by the rotation of the die 22 are compressed between the die 22 and the roller, and are forced through the die cavities 26 in the die 22. As the color concentrate pellets 30 are extruded, a knife 28 shears the pellets. The length of the pellets can be controlled by controlling the process parameters. The die cavities are tubelike orifices, preferably circular in cross section, preferably without taper from inlet side to outlet side, and with a diameter between about 3/32 and about 5/32 inch, and preferably with a diameter of about ⅛ inch, so as to produce cylindrical pellets. Alternatively, other cross sections, such as square, rectangular, triangular, etc., can be utilized. The bulk density of the pellets which come out of the pellet mill is approximately the same as the bulk density of the granules which go into the pellet mill.

The pellets are "cold-pressed" or "cold-formed," which as used in the claims and specification herein means mechanically pressed or compacted without applying substantial external heat, and without melting the mass of the material to form a cohesive and united body. When pellets are formed in a pellet mill as described herein, the pellets are friable. The granules are united by compaction. By cold pressing the granules in the die cavities, the color concentrate pellets are shaped into forms that are mixable and processable with conventionally shaped natural resin pellets without substantial settling.

The pellets produced as described above are friable. They can be broken apart and/or crumbled with one's fingernail, or with light tapping with the handle of a tool such as a screwdriver. Since they are friable, these pellets break up and incorporate more quickly with natural resin pellets, thus leading to better mixing, dispersion and distribution of the pigment throughout the natural resin. Conventional extruded pellets tend not to be friable, but tend to be a melted mass forming one body. The pellets of the present invention are comprised of granules which have not been melted and fused to form a single or continuous body.

Organic pigments, being hydrophilic, will tend to agglomerate if exposed to the atmosphere. The carriers of the present invention tend to keep the organic pigments dry when in pellet form.

Uniform dispersability is a desirable characteristic in color concentrate pellets. The pellets of the present invention have better dispersability and more uniform distribution than conventional extruded pellets. This results in more consistent color in part after part after part of the ultimate product. Dispersability is measured in lightness, chroma, and hue. The objective is to have the pigment particles separated from one another, and evenly distributed throughout the finished or final article. In the practice of the present invention, lightness, chroma, and hue are put under statistical process control, wherein these characteristics are controlled to a 3-sigma control limit. Thus, lightness, chroma, and hue are all controlled within 3-sigma or less.

Most mixing and subsequent processing of color concentrate pellets and natural resin pellets occurs at temperatures up to and including about 400° F. Certain pigments, including particularly organic pigments, are degraded or burned out at 400° to 550° F. Such pigments cannot generally be used in conventional extruded pellets, since such pellets are produced at temperatures in the range of 550° to 600° F. However, these heat-sensitive pigments can be utilized in pellets of the present invention, since such pellets are preferably produced at temperatures less than about 200° F. and are then added to natural resins and processed at temperatures not greater than about 400° F.

The color concentrate pellets of the present invention can be used for injection molding (automobile and non-automobile grades), sheet extrusion, profile extrusion, casting, and blow molding. The pellets of the present invention tend to be universal pellets in that they can be used with a large number of different kinds of natural resin pellets. This is in contradistinction to conventional extruded pellets, which generally can be used only with natural resin pellets which have a resin of the same or very similar type as the carrier of the extruded pellet. The universality of the pellets of the present invention is due both to the nature of the carrier used and also to the fact that there can be so little carrier used per pellet If there is only a small amount of carrier in a pellet, it will tend not to affect the physical characteristics of the finished product For example, for 100 lbs. of natural resin, one may need only one or two pounds of color concentrate pellets of the present invention. In addition, these pellets melt more quickly, and thus blend better and are incorporated better with natural resin pellets during the coloring process.

The Examples which follow illustrate the types of formulations which have been successfully utilized to make color concentrate pellets according to the present invention.

EXAMPLE 1

| Ingredient | Percent By Weight |
| --- | --- |
| Pigment | |
| titanium dioxide | 25 |
| carbon black | 5 |
| quinacridone red | 22 |
| quinacridone violet | 20 |
| cadmium yellow | 3 |
| Sorbitan monostearate | 5 |
| Titanate coupling agent (isopropyl-tri-titanate) | 0.5 |
| Ethylene bis stearamide (bis-stearamide wax) | 19.5 |

In this Example, the last three ingredients comprise the carrier. The sorbitan monostearate used is Glycomul S from Glyco Chemical Corp., Greenwich, Conn. It has a melting point of 122° to 131° F. The titanate coupling agent used is Product TTS from Kenrich Chemical Corp., Bayonne, N. J. 07002. The ethylene bis stearamide (bis stearamide wax) used is Kemamide S from Witco Chemical Company, Memphis, Tenn. It has a melting point of approximately 208° F. to 226° F. Thus, its melting point is between 120° and 250° F. Bis stearamide wax is also available from Glyco Chemical Corp., Greenwich, Conn., as Acrawax C. The monostearate acts as a surfactant; the titanate coupling agent couples the pigment with the wetting agent; and the ethylene bis stearamide acts as a wetting agent. In a pellet of this general composition, the ingredients can have percent-by-weight ranges as follows: pigment, typically about 50% to about 75%; sorbitan monostearate, 1% to 9%; titanate coupling agent, 0.5% to 1.0%; and bis stearamide wax, 15% to 45%.

The carrier of Example 1 is considered to be a universal carrier, and is compatible with a very wide variety of natural resins, including ABS, polypropylene, high-density polyethylene, low-density polyethylene, nylon, polycarbonate, polyvinyl chloride (flexible and rigid), polyesters, acetals, and polystyrene. In the present invention, this universal compatibility is due to the inherent compatibility of the carrier with the various natural resins and/or because the carrier is present in such small amounts that it will not appreciably affect the physical properties of the final product in which it is incorporated. The carrier of Example 1 is a carrier frequently used with organic pigments because it drives off the moisture which can be present in organic pigments (see the description above).

A-C 6, a low molecular weight polyethylene wax available from Allied Corporation, Morristown, N. J., can be substituted for bis stearamide wax in this Example and the other Examples herein. A-C 6 is particularly compatible with polystyrene, high density polyethylene, and polypropylene.

Products molded from a combination of pigment pellets of Example 1 and natural resin have an even, uniform distribution of pigment.

In the pigment of Example 1, molybdate orange, an inorganic pigment, can be substituted for the quinacridone red, an organic pigment. Alternatively, the organic pigments, in total, can be reduced in percentage to 1% or 5% and be replaced by titanium dioxide.

EXAMPLE 2

| Ingredient | Percent By Weight |
| --- | --- |
| Pigment | |
| chrome yellow | 60 |
| quinacridone violet | 20 |
| phthalocyanine blue | 10 |
| Bis stearamide wax | 5 |
| A-C 400A ethylene vinyl acetate (EVA) | 5 |

The carrier in Example 2 is the last two ingredients. The ethylene vinyl acetate used is A-C 400A, from Allied-Signal, Inc., Morristown, N. J. A-C 400A is an ethylene copolymer with vinyl acetate, comprising about 87% ethylene and about 13% vinyl acetate, and having a number average molecular weight of about 3000 and a melting point of about 203° F. It is believed that A-C 400A with a vinyl acetate content of 12% to 16% would also work. A-C 400 is another alternative. It is believed that ethylene vinyl acetate with a melting point in the range of 190° to 220° F. and vinyl acetate content in the range of 12% to 16% would also work as an alternative to A-C 400A. The ethylene in EVA causes good wetting with the pigment and subsequently causes good mixing with polyethylene, polypropylene, PVC, polystyrene, and similar natural resins, and has good compatibility across the conventional polymer range. The vinyl structure in EVA causes good mixing with vinyl-type resins such as PVC. The acetate in EVA causes good mixing with ABS and polystyrene and similar-type resins. In Example 2, the ingredients can range in percent-by-weight as follows: pigment, from about 50% to about 90%; bis stearamide wax, preferably from about 5% to about 30%; and ethylene vinyl acetate, preferably from about 5% to about 30%. It is preferred that the bis-stearamide wax and the ethylene vinyl acetate be present in about a 1:1 ratio by weight.

With a carrier of the type described in Example 2, it is generally preferable to stay with a lower level of organic pigments. Thus, alternatively, the quinacridone violet can be eliminated and the phthalocyanine blue be reduced in percentage to 1% or 5%, and chrome yellow be increased to make up the difference. The organic pigments do not work so well with this carrier, due to the fact that organic pigments can contain moisture. The moisture can be driven off; one simply has to run the Henschel mixer longer. As can be seen, the carrier of Example 2 is suitable for higher levels of pigment loading (i.e., up to about 90%, including both organic and inorganic). In Example 2, the pigment can also be all inorganic, such as 90% by weight chrome yellow.

The carrier of Example 2 is compatible with all the natural resins listed in Example 1. Thus, this carrier is considered a universal carrier.

EXAMPLE 3

| Ingredient | Percent By Weight |
| --- | --- |
| Pigment | |
| phthalocyanine green | 40 |
| quinacridone violet | 2 |
| titanium dioxide | 38 |
| Bis stearamide wax | 10 |
| A-C 400A ethylene vinyl acetate (EVA) | 10 |

The comments regarding Example 2 also apply to Example 3.

EXAMPLE 4

| Ingredient | Percent By Weight |
| --- | --- |
| Pigment | |
| quinacridone violet | 25 |
| phthalocyanine blue | 17 |
| titanium dioxide | 25 |
| carbon black | 13 |
| Hindered amine light stabilizer (HALS) | 20 |

Pellets comprising the ingredients listed in Example 4 have been prepared and have unique applicability. HALS is an ultraviolet (UV) stabilizer and in this case acts in a dual capacity, as the additive and as the carrier. HALS is available from the Mitsui Company in Houston, Tex. as Product No. 770-LS. When pellets of this type are utilized with natural resins, both pigment and a UV stabilizer are added at the same time without the necessity of any other carrier.

EXAMPLE 5

| Ingredient | Percent By Weight |
| --- | --- |
| Pigment | |
| phthalocyanine green | 25 |
| azo yellow | 17 |
| carbon black | 8 |
| Hindered amine light stabilizer (HALS) | 10 |
| Bis stearamide wax | 20 |
| A-C 400A ethylene vinyl acetate (EVA) | 20 |

In this composition, the pigment can range from about 40% to 60% to about 90% by weight, whereas, the remaining three ingredients combined can range from about 10% to about 60% by weight. Alternatively, the EVA can be eliminated, in which case the composition is 50% by weight pigment, 10% HALS, and 40% bis stearamide wax. Alternatively, in the formulation in the preceding sentence, ethylene vinyl acetate can be substituted for bis stearamide wax in some applications.

EXAMPLE 6

| Ingredient | Percent By Weight |
| --- | --- |
| Pigment | |
| quinacridone red | 30 |
| quinacridone violet | 5 |
| azo yellow | 7 |
| titanium dioxide | 4 |
| carbon black | 4 |
| Hindered amine light stabilizer (HALS) | 25 |
| Carrier from Example 1 | 25 |

Here, the carrier from Example 1 has three components, which are included in the same relative proportions as indicated in Example 1, to total 25% by weight. Pellets of this composition have been successfully tested.

EXAMPLE 7

| Ingredient | Percent By Weight |
| --- | --- |
| Pigment | |
| titanium dioxide | 20 |
| phthalocyanine blue | 10 |
| nickel titanate yellow | 5 |
| copper chromite black | 15 |
| Bis stearamide wax | 15 |
| Siding-grade PVC compound | 35 |

The carrier in Example 7 is specific for vinyl. Siding-grade PVC compound contains, on a by-weight basis, the following: 100 parts of Geon 101 EPF24 PVC resin from B.F. Goodrich Co., Cleveland, Ohio 44131; 0.4 to 2.5 parts tin stabilizer MT181 from Atochem North America, Buffalo, N. Y. 14240; 1 to 2 parts Kemamide S from Witco Chemical Co., Memphis, Tenn.; 0.5 to 2 parts COAD 10 calcium stearate from Maroon Chemical Co., Cleveland, Ohio; 0.1 to 0.5 parts Product K120N process aid from Rohm & Haas Co., Philadelphia, Penna. 19105; and 1 to 10 parts Richardson DS200 impact modifier from Nova Corp., Leominster, Mass. 10453. In Example 7, the pigment can range from about 20% to about 50% by weight, the bis stearamide wax can range from about 5% to about 20% by weight, and the PVC compound can range from about 20% to about 60% by weight. Alternatively, the pigment can be 100% inorganic.

From the foregoing, it can be seen that the carrier can be a mixture of a stearamide wax (bis stearamide) and a stearate (sorbitan monostearate) or a mixture of a stearamide wax and a low molecular weight, waxy EVA polymer. A waxy carrier has a substantial proportion of a waxy material or the equivalent of a waxy material, such as a low molecular weight EVA, for the described purposes. The carrier wets the pigment to facilitate proper dispersion in the natural resin. The carrier also assists in holding the pigment together in pellet form well enough to permit the pellets to be handled, but not so much as to prevent friability. The carrier also tends to hold the granules together. As noted, however, the pellets are friable and easily broken apart, all of which is an advantage in the mixing process.

The present application also has application beyond organic and inorganic pigments. Based on experimental evidence to date, certain other materials in the nature of fillers and additives can be substituted for the pigment in the above Examples, and be bound by the carriers identified in the above Examples and be encapsulated in the high intensity mixer and pelletized as described above to form pellets which are mixable and proceseable with conventionally sized natural resin pellets without settling out (substantial or otherwise). This will make the use of these fillers and additives much more convenient and effective in the plastics industry. The following Examples are given to illustrate this invention.

EXAMPLE 8

Slip Agents

Bis stearamide wax can be substituted for pigment and added to the carriers above as a slip agent. A slip agent reduces static electricity and lets sheets of molded material slide apart so that they will not stick together.

EXAMPLE 9

Anti-Stats

MOLD-WIZ a trademark of Axel Plastics Company Woodside, N. Y., can be substituted for pigment and added to the carriers above as an anti-stat. Such a component reduces static electricity in the finished product. For example, anti-stat pellets and color concentrate pellets could be mixed and processed with natural resin pellets to produce colored finished products with reduced static electricity properties.

EXAMPLE 10

Fillers

Various fillers can be substituted for pigment and added to the carriers above and encapsulated and pelletized as described. Such fillers would include calcium carbonate ($CaCO_3$), talc, and glass. Calcium carbonate is available from Palmer Supply Co., Cleveland, Ohio, and talc is available from Dartech Co., Cleveland, Ohio. It has been found that when calcium carbonate is pelletized, as described, it is much easier to handle and the clarity is much greater.

EXAMPLE 11

UV Light Stabilizers

Ultraviolet (UV) light stabilizers such as HALS from Mitsui Company in Huston, Tex. can be substituted for pigment and treated like the fillers, anti-slat, and slip agents described above. They have been demonstrated to work very well in the field.

It has also been discovered that powdered or flaked HALS can be run through a pellet mill and pelletized, without first processing it in a Henschel mixer to produce pellets which are 100% HALS. No pigments, carriers or additives are added. These pellets are expected to be very useful in the automotive industry.

EXAMPLE 12

Purging Compounds

Purging compounds can be encapsulated in the Henschel mixer and pelletized in the pellet mill as described above. A typical purging compound is 10% titanium dioxide, 60% calcium carbonate, 10% antimony oxide, and 20% bis stearamide wax. Such purging compound pellets have been demonstrated to work very well in the field. A purging compound is used basically to clean old pigment and plastic out of a machine. A purging compound is a highly loaded compound containing abrasive materials that scours out the previous residue.

It will be clear to those skilled in the art that various modifications and changes can be incorporated in the aspects of the present invention. All such modifications and changes that fall within the scope of the appended claims are intended to be covered by the present application.

What is claimed is:

1. A color concentrate pellet comprising at least about 30% pigment by weight and a carrier wherein said color concentrate pellet has at least partially a geometric shape formed by a die cavity and is of a size and shape and composition such that a plurality of said color concentrate pellets are mixable and processable with commercially sized natural resin pellets to produce colored resin without substantial settling out of said color concentrate pellets from said natural resin pellets, the carrier of said color concentrate pellet having a melting point less than about 230° F., said pellet being cold-formed in a press in such a way that the pellet is cohesive as a result of mechanical pressure and is friable to improve its dispersibility.

2. The color concentrate pellet of claim 1, wherein said carrier includes a wax with a melting point between 120° F. and 250° F.

3. The color concentrate pellet of claim 2, wherein said wax is bis stearamide wax.

4. The color concentrate pellet of claim 1, wherein said color concentrate pellet comprises at least 80% pigment by weight.

5. The color concentrate pellet of claim 1, wherein said color concentrate pellet comprises at least 45% by weight of inorganic pigments and at least 1% by weight of organic pigments.

6. A pellet for use in the plastics industry, comprising a carrier and an additive, said additive being selected from the group consisting of a slip agent, an anti-stat compound, calcium carbonate, talc, glass, ultraviolet light stabilizer and purging compound, wherein said pellet has at least partially a geometric shape formed by a die cavity and is of a size and shape such that a plurality of said pellets are mixable and processable with commercially sized natural resin pellets without substantial settling out of said pellets from said natural resin pellets, said carrier having a melting point of less than about 230° F., said pellet being cold-formed in a press in such a way that the pellet is cohesive as a result of mechanical pressure.

7. The color concentrate pellet of claim 1, said plurality of said pellets being commercially mixable and processable and compatible with polypropylene, high-density polyethylene, and polystyrene natural resin pellets.

8. The color concentrate pellet of claim 7, said plurality of said pellets being also commercially mixable and processable and compatible with acrylonitrile-butadiene-styrene, low-density polyethylene, and polyvinyl chloride natural resin pellets.

9. The color concentrate pellet of claim 1, the carrier comprising an ultraviolet light stabilizer.

10. The color concentrate pellet of claim 9, wherein said ultraviolet light stabilizer is a hindered amine light stabilizer.

11. The color concentrate pellet of claim 1, the carrier consisting of an ultraviolet light stabilizer.

12. A color concentrate pellet comprising at least 20% pigment by weight and a carrier wherein said color concentrate pellet has at least partially a geometric shape formed by a die cavity and is of a size and shape and composition such that a plurality of said color concentrate pellets are mixable and processable with commercially sized natural resin pellets to produce colored resin without substantial settling out of said color concentrate pellets from said natural resin pellets, the carrier of said color concentrate pellet having a melting point less than about 230° F., said pellet being cold-formed in a press in such a way that the pellet is cohesive as a result of mechanical pressure and is friable to improve its dispersibility, said carrier comprising siding-grade polyvinyl chloride compound.

13. The pellet of claim 6, said additive being a slip agent.

14. The pellet of claim 6, said additive being an antistat compound.

15. The pellet of claim 6, said additive being calcium carbonate.

16. The pellet of claim 4, said additive being talc.

17. The pellet of claim 6, said additive being glass.

18. The pellet of claim 6, said additive being an ultraviolet light stabilizer.

19. The pellet of claim 6, wherein said carrier and said additive are both 100% hindered amine light stabilizer.

20. The pellet of claim 6, said additive being a purging compound.

21. The pellet of claim 6, said plurality of said pellets being commercially mixable and processable and compatible with polypropylene, high-density polyethylene, and polystyrene natural resin pellets.

22. The pellet of claim 21, said plurality of said pellets being also commercially mixable and processable and compatible with acrylonitrile-butadiene-styrene, low-density polyethylene, and polyvinyl chloride natural resin pellets.

23. The pellet of claim 6, the carrier comprising an ultraviolet light stabilizer.

24. The pellet of claim 23, wherein said ultraviolet light stabilizer is a hindered amine light stabilizer.

25. The pellet of claim 6, the carrier consisting of an ultraviolet light stabilizer.

26. The color concentrate pellet of claim 7, said carrier comprising bis stearamide wax and ethylene vinyl acetate.

27. The color concentrate pellet of claim 26, said pellet having a cylindrical shape formed by a circular die cavity, said pellet comprising about 5% to about 30% bis stearamide wax by weight, about 5% to bout 30% ethylene vinyl acetate by weight, and about 50% to about 90% pigment by weight.

28. The color concentrate pellet of claim 27, the bis stearamide wax and ethylene vinyl acetate being present in about a 1:1 ratio by weight, the pellet comprising at least 1% organic pigment by weight.

29. The color concentrate pellet of claim 1, said color concentrate pellet further comprising about 10% to about 25% hindered amine light stabilizer by weight and about 50% to about 80% pigment by weight.

30. The color concentrate pellet of claim 11, said ultraviolet light stabilizer being hindered amine light stabilizer, said color concentrate pellet comprising about 20% hindered amine light stabilizer by weight and about 80% pigment by weight.

* * * * *

UNITED STATES PATENT AND TRADEMARK OFFICE
CERTIFICATE OF CORRECTION

PATENT NO. : 5,176,751                                Page 1 of 2
DATED      : Jan. 5, 1993
INVENTOR(S): Larry K. Findley It is certified that error appears in the above-identified patent and that said Letters Patent is hereby corrected as shown below:

Column 3, line 39, replace "." with --,--.

Column 3, line 47, after "that" insert --a--.

Column 4, line 29, change "tith" to --with--.

Column 4, line 38, after "case" insert --,--.

Column 4, line 40, after "non-transparent" insert --,--.

Column 6, line 5, delete "." and substitute therefore --,--.

Column 7, line 38, after "pellet" insert --.--.

UNITED STATES PATENT AND TRADEMARK OFFICE
CERTIFICATE OF CORRECTION

PATENT NO. : 5,176,751
DATED : Jan. 5, 1993
INVENTOR(S) : Larry K. Findley

It is certified that error appears in the above-identified patent and that said Letters Patent is hereby corrected as shown below:

Column 7, line 41, after "product" insert --,--.

Column 11, line 9, after "EVA" delete "." and insert therefore --,--.

Column 11, line 25, delete "proceseable" and substitute therefore --processable--.

Column 11, line 43, after "Company" insert --,--.

Column 11, line 67, change "Huston" to --Houston--.

Column 11, line 68, change "anti-slat" to --anti-stat--.
Column 14, line 28
  Claim 27, line 4, delete "bout" and substitute therefore --about--.
Column 13, line 43
  Claim 16, line 1, delete "4" and substitute therefore --6--.

Signed and Sealed this

Eighteenth Day of January, 1994

Attest:

*Attesting Officer*

BRUCE LEHMAN
*Commissioner of Patents and Trademarks*